United States Patent
Keshavan et al.

(10) Patent No.: US 11,898,497 B2
(45) Date of Patent: Feb. 13, 2024

(54) SLOTTED CERAMIC COATINGS FOR IMPROVED CMAS RESISTANCE AND METHODS OF FORMING THE SAME

(71) Applicant: General Electric Company, Schenectady, NY (US)

(72) Inventors: Hrishikesh Keshavan, Watervliet, NY (US); Curtis Alan Johnson, Niskayuna, NY (US); Hongqiang Chen, Niskayuna, NY (US); Bernard Patrick Bewlay, Niskayuna, NY (US); Byron Andrew Pritchard, Jr., Loveland, OH (US); Mehmet M. Dede, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 16/727,004

(22) Filed: Dec. 26, 2019

(65) Prior Publication Data
US 2021/0199053 A1 Jul. 1, 2021

(51) Int. Cl.
*F02C 7/24* (2006.01)
(52) U.S. Cl.
CPC .................................... *F02C 7/24* (2013.01)
(58) Field of Classification Search
CPC ..... B23K 26/364; C04B 35/48; C04B 35/505; F01D 5/18; F01D 5/186; F01D 9/02; F01D 25/08; F01D 25/12; F01D 5/288; F02C 7/24; F23M 5/02; F23R 3/002; F23R 3/007
See application file for complete search history.

(56) References Cited

U.S. PATENT DOCUMENTS

| | | | |
|---|---|---|---|
| 4,377,371 A | 3/1983 | Wisander et al. |
| 5,419,971 A | 5/1995 | Skelly et al. |
| 5,558,922 A | 9/1996 | Gupta et al. |
| 5,681,616 A | 10/1997 | Gupta et al. |
| 6,010,746 A | 1/2000 | Descoteaux et al. |
| 6,316,078 B1 | 11/2001 | Smialek |
| 6,511,762 B1 | 1/2003 | Lee et al. |

(Continued)

FOREIGN PATENT DOCUMENTS

| | | | |
|---|---|---|---|
| EP | 1642993 A1 | 4/2006 | |
| WO | WO2010149420 A1 | 12/2010 | |
| WO | WO-2016105327 A1 * | 6/2016 | ............. F23R 3/002 |

OTHER PUBLICATIONS

Bilge et al., CMAS-Resistant Plasma Sprayed Thermal Barrier Coatings Based on Y2O3-Stabilized ZrO2 with Al3+ and Ti4+ Solute Additions, Journal of Thermal Spray Technology, vol. 23 Issue: 4, Apr. 2014, pp. 708-715.

(Continued)

*Primary Examiner* — Maria V Ewald
*Assistant Examiner* — Ethan Weydemeyer
(74) *Attorney, Agent, or Firm* — Dority & Manning, P.A.

(57) ABSTRACT

A coated component for a gas turbine engine is provided. The coated component includes a substrate having a surface and a ceramic coating. The ceramic coating includes one or more linear slots and one or more non-linear slots. The one or more non-linear slots intersect the one or more linear slots. The plurality of linear slots and the plurality of non-linear slots form segments of ceramic coating material.

20 Claims, 9 Drawing Sheets

(56) References Cited

U.S. PATENT DOCUMENTS

| | | |
|---|---|---|
| 6,703,137 B2 | 3/2004 | Subramanian |
| 7,220,458 B2 | 5/2007 | Hollis et al. |
| 7,665,306 B2 | 2/2010 | Bronson et al. |
| 7,704,596 B2 | 4/2010 | Merrill et al. |
| 8,356,482 B2 | 1/2013 | Duval et al. |
| 8,357,454 B2 | 1/2013 | Kulkarni et al. |
| 8,470,460 B2 | 6/2013 | Lee |
| 8,852,720 B2 | 10/2014 | Bolcavage et al. |
| 9,194,243 B2 | 11/2015 | Bolcavage et al. |
| 9,625,152 B2 | 4/2017 | Papple et al. |
| 9,920,646 B2 | 3/2018 | Lee et al. |
| 9,950,382 B2 | 4/2018 | Stastny et al. |
| 2003/0221315 A1 | 12/2003 | Baumann et al. |
| 2009/0169752 A1 | 7/2009 | Fu et al. |
| 2009/0252985 A1 | 10/2009 | Nagaraj et al. |
| 2012/0317984 A1 | 12/2012 | Dierberger |
| 2016/0347671 A1 | 12/2016 | Strock |
| 2018/0371923 A1 | 12/2018 | Johnson et al. |

OTHER PUBLICATIONS

Rai, et al., CMAS-Resistant Thermal Barrier Coatings (TBC). International Journal of Applied Ceramic Technology, vol. 7, Issue 5, 2010, pp. 662-674.

Wu et al., Evaluation of Plasma Sprayed YSZ thermal Barrier Coatings with the CMAS Deposits Infiltration using Impedance Spectroscopy, Progress in Natural Science: Materials International, vol. 22 Issue: 1, Feb. 2012, pp. 40-47.

\* cited by examiner

SLOTTED CERAMIC COATINGS FOR
IMPROVED CMAS RESISTANCE AND
METHODS OF FORMING THE SAME

FIELD

Embodiments of the present invention generally relate to ceramic coatings (e.g., thermal barrier coatings and environmental barrier coatings) for components of turbomachinery, such as gas turbine engines.

BACKGROUND

Thermal barrier coatings (TBCs) are generally needed for most recent high-performance gas turbine engines. The efficiency of a combustion turbine engine improves as the firing temperature of the combustion gas is increased. As the firing temperatures increase, improved high temperature durability of the turbine components is needed. Nickel and cobalt based superalloy materials are now used extensively for components in the hot gas flow path such as combustor liners and combustor transition pieces, and turbine rotating and stationary blades (directionally solidified and single crystal). However, even these most recent superalloys are not capable of surviving long-term operation at temperatures that can sometimes exceed 1,400° C. In many applications, a metal substrate is coated with a TBC that is a ceramic insulating material to reduce the service temperature of the underlying metallic segments of the components.

The strain tolerance of TBCs used in gas turbine engines is increased by the use of pores and through-thickness cracks within the TBC produced by air plasma spray (APS) and suspension plasma spray (SPS) methods and the use of columnar TBCs produced by electron beam physical vapor deposition (EBPVD) methods. However, environmental dust, such as dust containing some combination of calcium-magnesium-alumino-silicate (CMAS), is often ingested into the hot sections of gas turbine engines. The dust can deposit on components in the engine and, due to the high surrounding temperatures, can become molten. The resulting low-viscosity liquid infiltrates into the engineered pores and/or columns of the TBC on the component that protects the metal substrate. Once the liquid CMAS solidifies upon cooling, the compliance of the TBC and the strain tolerance capability of the coating decrease dramatically. Coating features needed for strain tolerance are filled by the solidified CMAS.

Further, with CMAS infiltration, the stresses that are generated in the TBC can cause early spallation of the coating. Spallation of the TBC creates hot spots in the metal substrate leading to reduction in component life. The spallation in turn leads to unscheduled maintenance, as well as parts replacement resulting in increased operating costs and increased servicing costs.

Gas temperatures in the high pressure turbine section of gas turbine engines have increased in recent years, and as a result the ceramic TBCs become increasingly vulnerable to attack by molten CMAS deposits resulting from the ingestion of siliceous particulates (e.g., dust, sand, volcanic ash, debris) with the intake of air. Even when particle removal strategies are utilized, small diameter particles are still able to reach the turbine section, where they melt, and infiltrate through its interconnected network of inter-columnar pores.

Thus, an improved design of a TBC coated metal component, particularly a component for gas turbine engines, is desirable in the art.

BRIEF DESCRIPTION

Aspects and advantages of the invention will be set forth in part in the following description, or may be obvious from the description, or may be learned through practice of the invention.

In one exemplary embodiment of the present disclosure, a coated component for a gas turbine engine is provided. The coated component defines a longitudinal direction, and the coated component includes a substrate defining a surface, and a ceramic coating disposed along the surface of the substrate. The ceramic coating has a plurality of linear slots disposed in the ceramic coating, and a plurality of non-linear slots disposed in the ceramic coating that intersect the plurality of linear slots. The plurality of linear slots and the plurality of non-linear slots form segments of ceramic coating material.

In certain exemplary embodiments, each of the plurality of linear slots extend radially from the longitudinal direction.

In certain exemplary embodiments, the surface of the substrate has a planar region and an out-of-plane region such that all points on the out-of-plane region are on a different plane than the planar region. At least one of the plurality of linear slots is disposed on both the planar region and the out-of-plane region.

In certain exemplary embodiments, each of the plurality of linear slots extends into the ceramic coating a depth, and a maximum distance between each of the plurality of linear slots is no greater than about 2.5 times the depth of the plurality of linear slots.

In certain exemplary embodiments, the plurality of linear slots and the plurality of non-linear slots are only disposed in the ceramic coating and do not extend into the surface of the substrate.

In certain exemplary embodiments, a distance between each of the plurality of linear slots is from about 430 microns to about 490 microns at an innermost segment of the coated component, and the distance between each of the plurality of linear slots continuously increases as it gets further away from the innermost segment.

In certain exemplary embodiments, the angle between at least one of the linear slots and the tangent at the surface where the linear slot is disposed is about 10 degrees to about 85 degrees.

In certain exemplary embodiments, each of the plurality of non-linear slots extends circumferentially around an orifice in the coated component.

In certain exemplary embodiments, the coated component is a fuel nozzle heat shield for a combustion chamber.

In certain exemplary embodiments, the coated component is a component for a dome assembly for a combustion chamber.

In certain exemplary embodiments, each of the plurality of linear slots and each of the plurality of non-linear slots extend 50 microns to 1,000 microns deep into the ceramic coating.

In certain exemplary embodiments, the ceramic coating comprises yttria stabilized zirconia, a rare earth stabilized zirconia composition, mullite, alumina, ceria, rare-earth zirconates, rare-earth oxides, metal-glass composites, or combinations thereof.

In another exemplary embodiment of the present disclosure, a method of forming a coated component for a gas turbine engine includes forming a ceramic coating along a surface of a substrate, forming a plurality of linear slots along the ceramic coating, and forming a plurality of non-linear slots along the ceramic coating that intersect the plurality of linear slots such that the plurality of linear slots and the plurality of non-linear slots form segments of ceramic coating material.

In certain exemplary embodiments, each of the plurality of linear slots extend radially from the longitudinal direction.

In certain exemplary embodiments, the surface of the substrate has a planar region 122 and an out-of-plane region 124 such that all points on the out-of-plane region 124 are on a different plane than the planar region, wherein the step of forming a plurality of linear slots comprises forming at least one of the plurality of linear slots on both the planar region 122 and the out-of-plane region 124.

In certain exemplary embodiments, the step of forming a plurality of linear slots comprises forming at least one linear slot only in the ceramic coating such that it does not extend into the surface of the substrate or a bond coat, and the step of forming a plurality of non-linear slots comprises forming at least one non-linear slot only in the ceramic coating such that it does not extend into the surface of the substrate or the bond coat.

In certain exemplary embodiments, a distance between each of the plurality of linear slots is from about 430 microns to about 490 microns at an innermost segment of the coated component, and the distance between each of the plurality of linear slots continuously increases as it gets further away from the innermost segment.

In certain exemplary embodiments, the step of forming a plurality of non-linear slots comprises forming a non-linear slot in a circumferential direction around an orifice of the coated component.

In certain exemplary embodiments, each of the plurality of linear slots extends into the ceramic coating a depth, and a maximum distance between each of the plurality of linear slots is no greater than about 2.5 times the depth of the plurality of linear slots.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
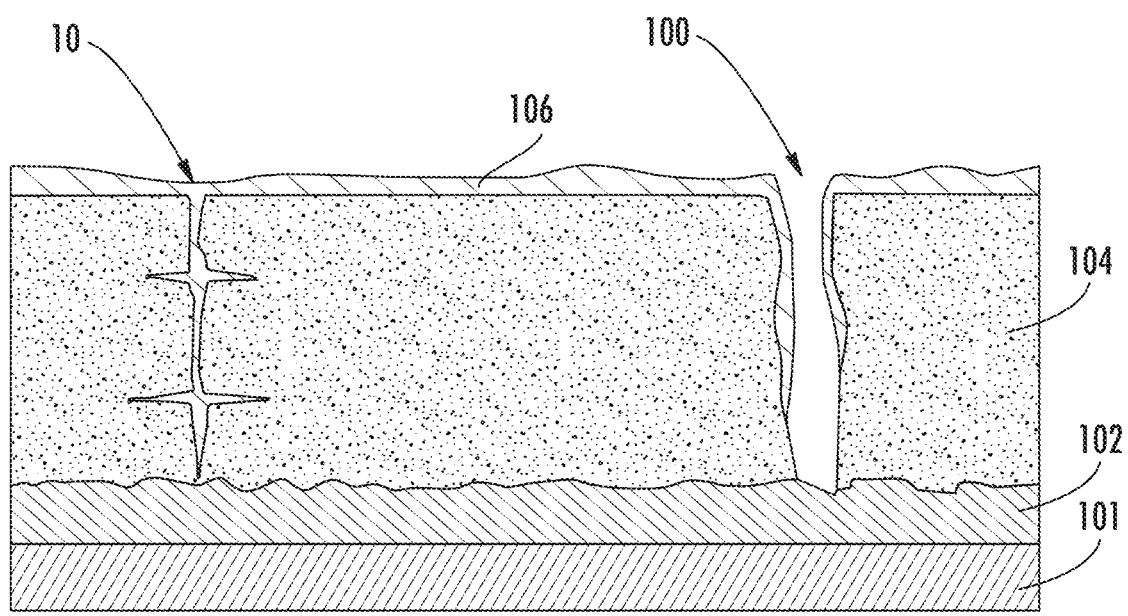
FIG. 1 shows a comparison of a conventional crack formed in a TBC and a slot formed in the TBC in accordance with one embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, an improved ceramic coating is generally provided with local slotting for improved coating durability. The improved ceramic coating has an improved balance of thermal strain tolerance, environmental resistance, and heat transfer performance in the distress zones of components, such as combustors, airfoils, heat shields, etc. The coating has improved environmental resistance, particularly to CMAS. The molten dust that forms during operation of the turbine engine at high operating temperatures typically includes some combination of CaO—MgO—$Al_2O_3$—$SiO_2$, commonly known as CMAS; small amounts of other oxides are often present in the molten composition as well, as is understood in the art. The present coating includes local and tailored slotting into the ceramic coating that creates segments of ceramic coating material. Thus, the ceramic coating material is segmented to provide a balance of CMAS resistance and heat transfer resistance. The approach can be applied to a variety of components, such as combustors, blades, nozzles, heat shields, etc.

FIG. 1 illustrates a conventional crack 10 formed in a coating 120 compared to a coating 120 including a slot 100 formed in the TBC 104 material in accordance with one embodiment of the present disclosure. FIG. 1 is a cross section and includes a bond coat 102, a TBC 104, and a layer of CMAS 106. FIG. 1 also includes a conventional crack 10 and the present slot 100. As shown in FIG. 1, the conventional crack 10 is completely filled by the molten CMAS 106, reducing the strain tolerance of the coating 120. In comparison, due to the configuration of the slot, the CMAS 106 does not completely fill the slot. The molten CMAS 106 can infiltrate into the slot, however, due at least in part to the geometry and width of the slot, the CMAS cannot bridge the slot. The configuration of the slot 100 reduces capillary forces that may pull CMAS into the slot, and possibly below the melting isotherm. Low in-plane modulus is maintained and in-plane compliance of the TBC 104 in the plane perpendicular to the slot 100 may be retained. The slot 100 may also prevent or delay large area spallation by acting as "crack-stoppers" preventing the formation of delamination cracks.

Figure 2:
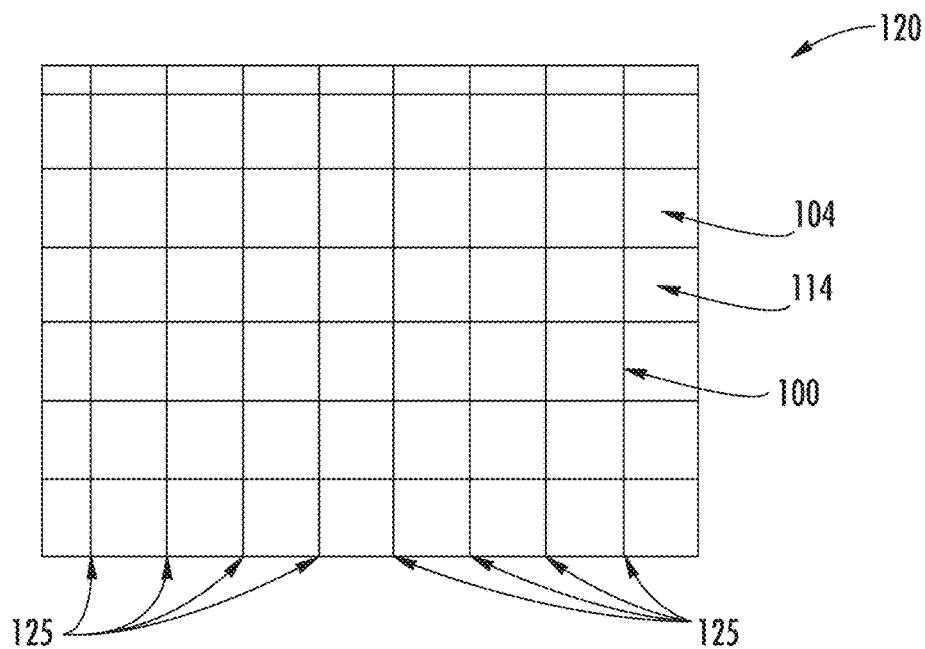
FIG. 2 illustrates a plan view of a plurality of slots in a coating in accordance with one embodiment of the present disclosure.

FIG. 2 illustrates a plurality of slots 100 formed in a TBC 104. In particular, FIG. 2 shows a TBC 104 coated substrate with a plurality of slots 100 disposed in the TBC 104. In some embodiments, the slots 100 may be disposed in any pattern, without regard for the location of features in the substrate 101, such as orifices or cooling holes. In the exemplary embodiment of FIG. 2, the plurality of slots 100 are disposed in a grid pattern forming segments 114 of TBC 104 material on the surface of the substrate 101, with the slots 100 being disposed in nominally parallel and perpendicular directions (approximately 0°/190° angles).

Figure 3:
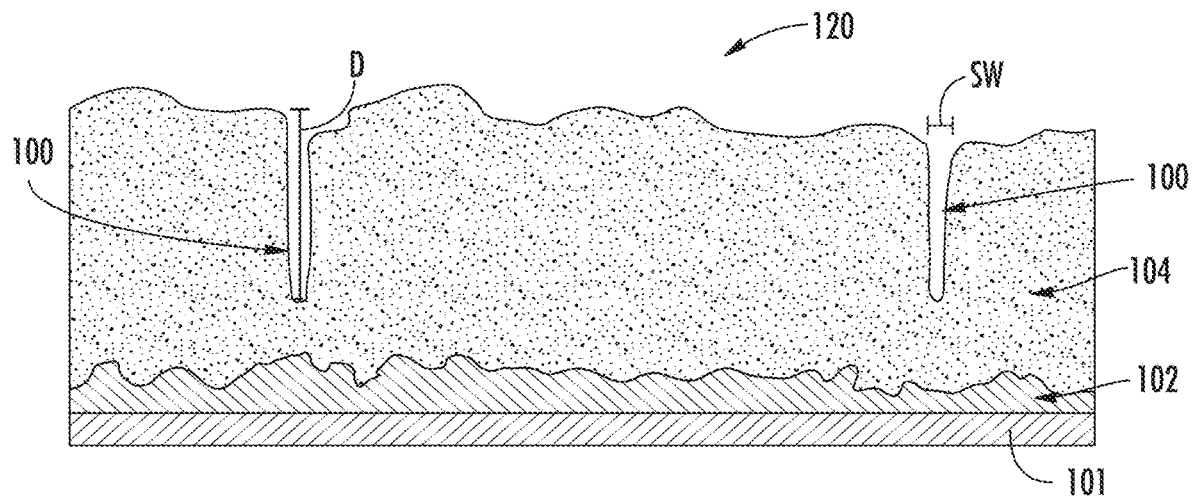
FIG. 3 is a cross section of a coating in accordance with one embodiment of the present disclosure.

FIG. 3 also illustrates the formation of slots 100 in the coating 120. FIG. 3 is a cross section of a coating 120 comprising a bond coat 102, a TBC 104, and slots 100 formed in the TBC 104. In particular, in the embodiment illustrated in FIG. 3, the coating 120 includes a bond coat 102 and a TBC 104 where the TBC 104 includes a single layer of TBC 104 material. However, in other embodiments, multiple layers may be utilized to form the TBC 104. The slots 100 may traverse one layer of the TBC 104 material, or may traverse multiple layers of TBC 104 material. The TBC 104 may have a total thickness of about 100 microns (about 3.9 mils) to about 2500 microns (about 98.4 mils), such as about 350 microns (about 13.8 mils) to about 700 microns (about 27.6 mils).

As shown, a plurality of slots 100 are formed throughout the coating 120 in the TBC 104. The coating 120 is disposed along a substrate 101 of a component, such as component 130 (shown in FIG. 4 and FIG. 8). In the embodiment illustrated in FIG. 3, the slots 100 do not extend to the bond coat 102. Without wishing to be bound by any particular theory, it is believed that extending the slots 100 into the bond coat 102 may, under some circumstances, detract from component life. Thus, in particular embodiments, the slots 100 may extend through the ceramic material of the TBC 104, either partially or fully.

In particular embodiments, the slots 100 extend through about 40% to about 85% of the total thickness of the TBC 104, such as about 50% to about 85%. For example, if the total TBC 104 thickness is about 610 microns (about 24 mils) to about 660 microns (about 26 mils), the slot 100 depth D can be about 380 microns (about 15 mils) to about 510 microns (about 20 mils). In another example, if the total TBC 104 thickness is about 355 microns (about 14 mils) to about 406 microns (about 16 mils), the slot 100 depth can be about 254 microns (about 10 mils) to about 305 microns (about 12 mils).

The slot width SW of the slots 100 may be designed to be sufficiently large to maintain desirably low capillary forces and to reduce risk of bridging of the slots 100 with molten material, but small enough to not substantially affect the thermal performance of the TBC 104. For example, the slots 100 may be about 10 microns (about 0.4 mils) to about 200 microns (about 7.9 mils) wide, such as about 10 microns (about 0.4 mils) to about 100 microns (about 3.9 mils) wide, about 15 microns (about 0.6 mils) to about 90 microns (about 3.5 mils) wide, or about 20 microns (about 0.8 mils) to about 80 microns (about 3.2 mils) wide. For instance, the slots 100 may be about 25 microns (about 1 mil) wide to about 75 microns (about 3 mils) wide to provide improved resistance to complete CMAS infiltration. Additionally, the slots 100 may have a depth sufficient to allow particles to deposit therein, but not reach the underlying substrate 101. For example, the slots 100 may have a depth of about 50 microns (about 2 mils) to about 1000 microns (about 39 mils), such as about 100 microns (about 3.9 mils) to about 800 microns (about 31.5 mils), or about 200 microns (about 7.9 mils) to about 700 microns (about 27.6 mils). The aspect ratio (depth to width) of the slots 100 may be about 2 to about 50, such as about 3 to about 10, or about 5 to about 10.

The slots 100 may be spaced about 250 microns (about 9.8 mils) to about 300 microns (about 11.8 mils) apart, such as about 200 microns (about 7.9 mils) to about 500 microns (about 19.7 mils) apart, or about 100 microns (about 4 mils) to about 700 microns (about 27.6 mils) apart. For instance, the slots 100 may be spaced about 100 microns (about 3.9 mils) apart. During operation of aircraft engines in environments that contain fine-scale dust, such as measured by the PM10 level, the dust can accumulate on the flow path surfaces and infiltrate into the pores of the TBC 104. The axial slots 100 may provide cross flow in or near the slot. Without wishing to be bound by any particular theory, it is believed that the axial slots 100 may thereby prevent dust deposition.

Although shown as being substantially perpendicular to the outer surface of the TBC 104 (i.e., about 90°), the slots 100 may be formed at another angle 118 with respect to the TBC 104's surface into the thickness of the TBC 104, such as about 60° to about 90°. The slots 100 may be produced by cutting with a high-speed saw, a laser system, abrasive water jet, or combinations thereof.

Various geometries of the slots 100 are available. In one embodiment, the slots 100 are parallel sided notches with an aspect ratio (depth/width) greater than 4 (e.g., about 4 to about 10). In another embodiment, the slots 100 may be of a V-shaped and/or U-shaped profile. It should be understood that the terms V-shaped and U-shaped describe the general geometry of the slots 100, while allowing for variations within the actual shape so as to not be a perfect V or U shape, respectively. The V-shape and/or U-shape may reduce the rate at which the closure of the slot 100 may occur due to CMAS build up on the sides of the slot 100 during operation.

A plurality of slots 100 may form an array of slots 100 traversing the TBC 104 in the coating 120. Each slot 100 may extend for the length of the surface of the coating 120 (i.e., the entire length of the surface). In most embodiments, each slot 100 has a length that is about 1 cm or longer (e.g., 1 cm to the end of the surface of the coating 120).

As used herein, "TBC" or "TBCs" is used to refer to stabilized ceramics that can sustain a fairly high temperature gradient such that the coated metallic components can be operated at gas temperatures higher than the metal's melting point. For instance, the TBC 104 material may be one or more of yttria stabilized zirconia (YSZ) and other rare-earth-stabilized zirconia compositions, mullite ($3Al_2O_3$-$2SiO_2$), alumina, ceria ($CeO_2$), lanthanum rare-earth zirconates, rare-earth oxides (e.g., $La_2O_3$, $Nb_2O_5$, $Pr_2O_3$, $CeO_2$), and metal-glass composites, and combinations thereof (e.g., alumina and YSZ or ceria and YSZ). Besides its high temperature stability, YSZ also has a good combination of high toughness and chemical inertness, and the thermal expansion coefficient of YSZ is a comparatively suitable match to that of the metallic components being coated.

The TBC 104 may be formed by any suitable process. For instance, one or more TBCs 104 may be formed by air-plasma spray (APS), suspension plasma spray (SPS), electron beam physical vapor deposition (EBPVD), high velocity oxygen fuel (HVOF), electrostatic spray assisted vapor deposition (ESAVD), and direct vapor deposition. APS may allow for higher deposition rates and better coverage of the surface than EBPVD. However, the porous and splat nature of the sprayed coating 120 from APS may limit the performance and life of the coating 120. TBCs 104 fabricated via EBPVD may withstand high thermo-mechanical stresses due to the columnar structures of the layer, resulting in a strain tolerant coating 120. For application in a turbine, a TBC 104 should be strongly bonded to the surface for multiple thermal cycles.

The bond coat 102 may be any suitable bond coat for improving the adherence of the TBC 104 to the underlying substrate 101 and may be generally uniform underneath the TBC 104. For instance, in some embodiments, a platinum modified nickel aluminide bond coat 102 may be formed on the substrate 101 and then a TBC 104 may be applied to the platinum modified nickel aluminide bond coat 102. Without intending to be limiting, the bond coat 102 may help prevent or reduce oxidation of the substrate 101, thereby also reducing spallation.

The substrate 101 may be any suitable material, for example a metal such as steel or superalloys (e.g., nickel-based superalloys, cobalt-based superalloys, or iron-based superalloys, such as Rene N5, N500, N4, N2, IN718, Hastelloy X, or Haynes 188) or other suitable materials for withstanding high temperatures. The TBC 104 may be disposed along one or more portions of the substrate 101 or disposed substantially over the whole exterior of the substrate 101.

The slots 100 are generally disposed locally on components to provide additional compliance and strain tolerance to prevent TBC 104 spallation. Typically, the slots 100 are positioned in high distress zones of components and may provide additional compliance and strain tolerance. Without intending to be bound by theory, the slots 100 can improve resistance to CMAS attack and increase component 130 life.

As stated above, the TBC 104 is slotted to provide a balance of CMAS resistance and heat transfer resistance. Additionally, the slots 100 locally address regions of a component 130, such as high distress zones, that are known to operate at high temperature and suffer spalling distress by CMAS fusion and infiltration. The slots 100 in the TBC 104 can be tailored to address the specific level of CMAS resistance that is required in the areas of concern. For example, deeper slots 100 can be used in regions of the TBC 104 where the TBC 104 may experience the hottest temperatures.

In particular, the slots 100 may be positioned locally in high distress zones. For instance, certain areas of a component 130 may be exposed to higher temperatures than surrounding areas. At these locations, the CMAS is more likely to melt and infiltrate cracks in the TBC 104.

Figure 4:
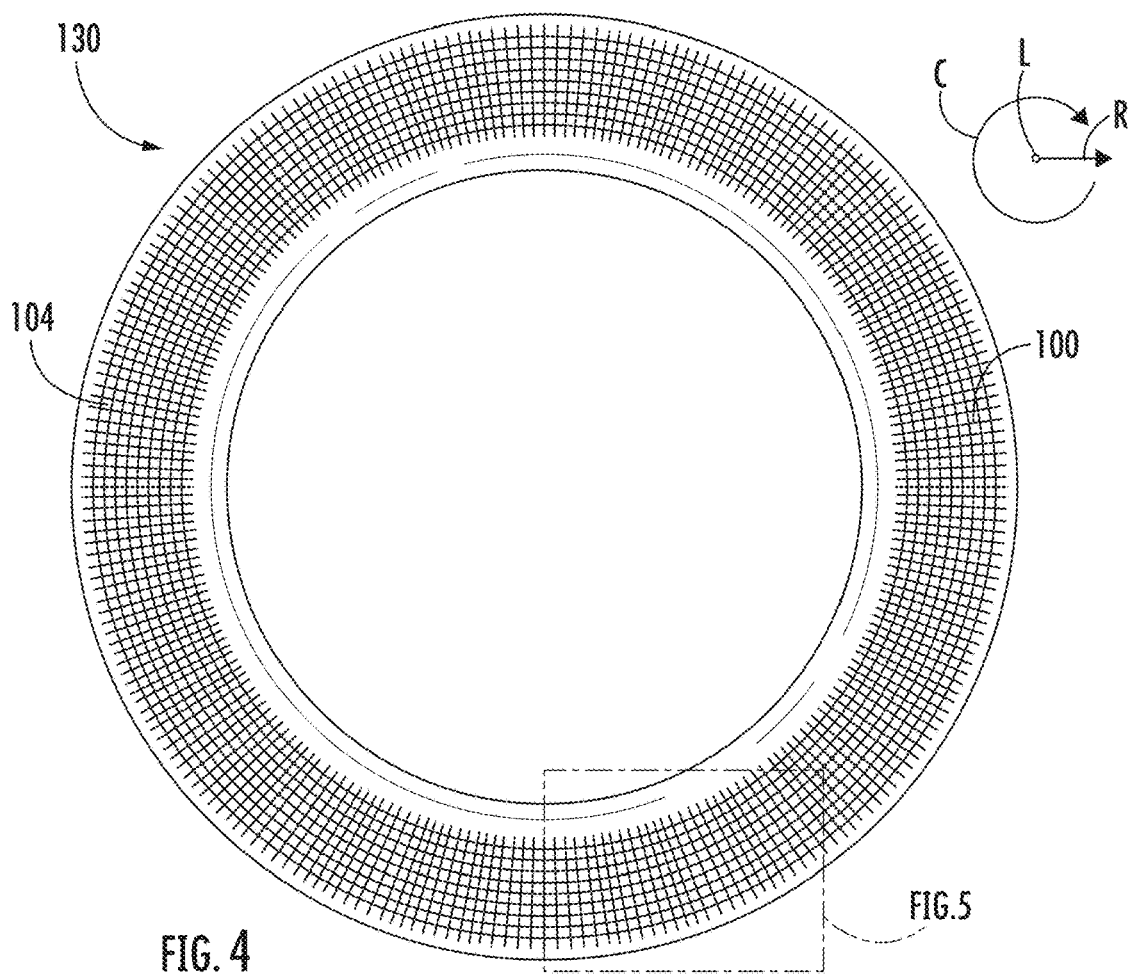
FIG. 4 illustrates a component for a gas turbine engine with a plurality of slots in accordance with one embodiment of the present disclosure.

FIG. 4 illustrates a component 130 for a gas turbine engine, according to one example. In this example, the component 130 is a heat shield for a fuel nozzle for the combustor section of a gas turbine engine. The component 130 can define a longitudinal direction L, going into and out of the drawing sheet and along the center of the component 130, radial directions R that are each perpendicular to the longitudinal direction and extend along a radius from the longitudinal direction, and circumferential directions C that each follow a circumference around the longitudinal direction. In some examples, the longitudinal direction is parallel to an axial direction of the gas turbine engine.

The component 130 of FIG. 4 features linear slots 100 that are disposed in the TBC 104 that extend radially and non-linear slots 100 that are disposed in the TBC 104 that extend circumferentially, according to this example. The slots 100 can be disposed in a quasi-grid pattern, forming segments 114 of TBC 104 material on the surface of the substrate 101, as best seen in the enlarged, partial view of FIG. 5. As used herein, "slot" can also refer to grooves, notches, indentations, or serrations in the TBC 104. Even though non-linear slots 100 are shown extending in a circumferential direction, it should be understood that other non-linear directions of the slots 100 are contemplated. For example, non-linear slots 100 could extend in an elliptical direction. In another example, non-linear slots 100 can include linear portions and can extend such that each non-linear slot 100 forms a curved square or curved rectangle. In yet another example, non-linear slots 100 can follow a path parallel to certain features in the component 130, such as an orifice.

Figure 5:
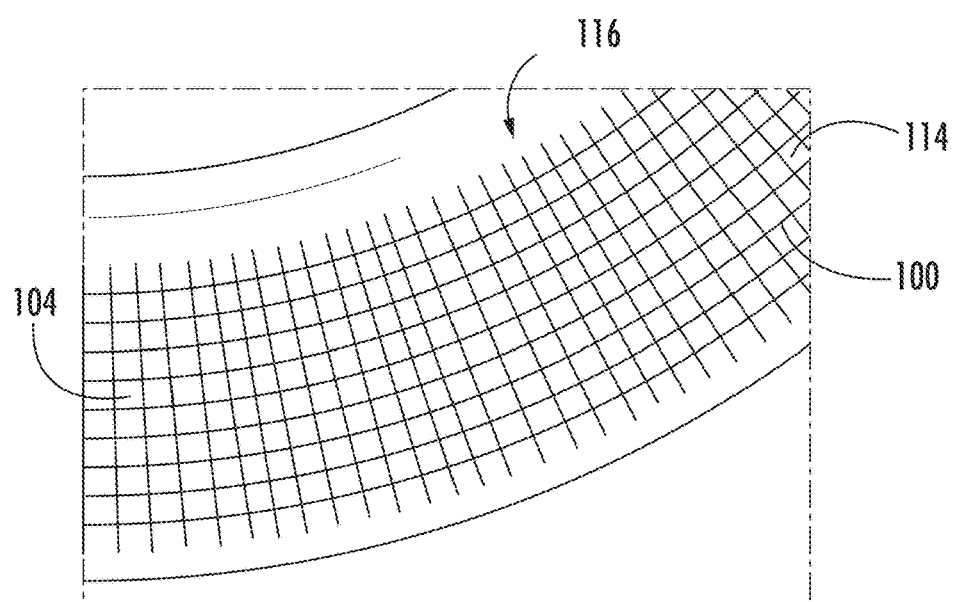
FIG. 5 illustrates a portion of the component of FIG. 4 in accordance with one embodiment of the present disclosure.
Figure 6:
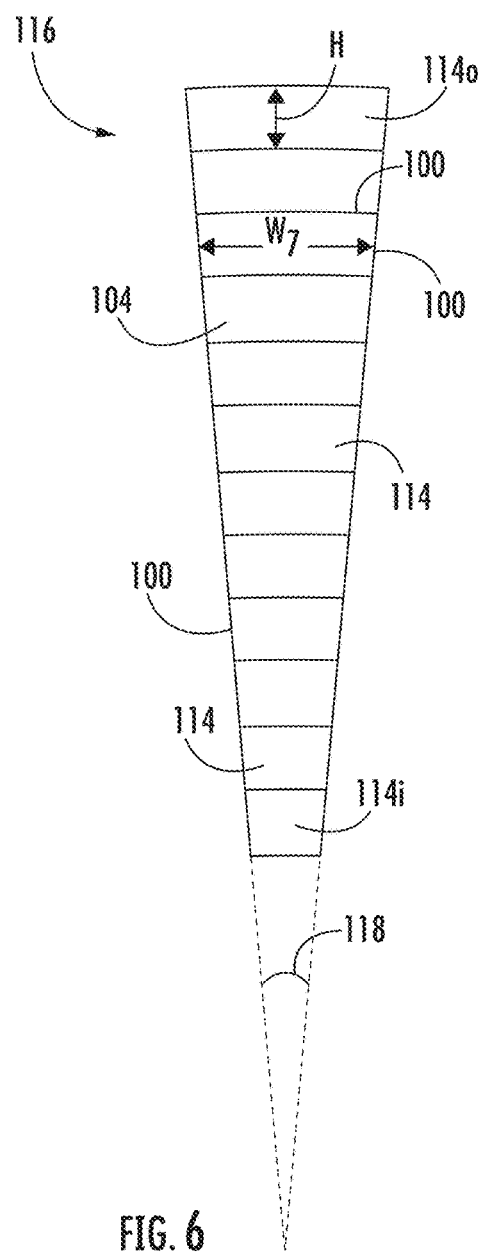
FIG. 6 illustrates a radial sector of the component of FIG. 4 in accordance with one embodiment of the present disclosure.

Now referring to FIG. 6, a schematic view of a radial sector 116 of the component 130 of FIGS. 4 and 5 is shown, according to one example. It should be understood that because this is a schematic view, the elements shown in the figure are not drawn to scale. In this example, two linear slots 100 are shown that extend radially and eleven non-linear slots 100 that extend circumferentially are shown. The two linear slots 100 and eleven non-linear slots 100 define twelve segments 114 of the TBC 104 material on the surface of the substrate 101 of the component 130 of FIG. 4. The innermost segment 114 (depicted in the example as 114*i*) is defined as the segment 114 that is closest to the center of the component 130. The outermost segment 114 (depicted in the example as 114*o*) is defined as the segment 114 that is furthest away from the center of the component 130.

In this example, the angle 118 between the linear slots 100 in a radial sector 116 can be approximately 1.36 degrees. In some examples, each radial sector 116 of the component 130 can be approximately the same size such that the angle 118 between all linear slots 100 of the component 130 is approximately 1.36 degrees. When the angle 118 between all radial slots 100 is approximately 1.36 degrees, 264 radial sectors 116 are formed in the TBC 104. It should be understood, however, that other angles 118 between the radial slots 100 are contemplated. The angles 118 between each radial slot can range from about one degree to about fifteen degrees, from about one degree to about ten degrees, or from about one degree to about five degrees. For example, spacing between each radial slot 100 could be approximately 1.8 degrees such that 200 radial sectors 116 are formed in the TBC 104. In yet another example, the spacing between each radial slot 100 could be approximately 1.2 degrees such that 300 radial sectors 116 are formed in the TBC 104.

It should also be understood that the angle 118 between each linear slot 100 can be different between two different radial sectors 116. For example, the component 130 can include a radial sector 116 that has an angle 118 between its linear slots 100 that is larger than the angle 118 between linear slots 100 of another radial sector 116 of the component 130. For example, the component 130 can include a radial sector 116 that has an angle 118 between its linear slots 100 that is approximately two degrees, and a second radial sector 116 that has an angle 118 between its linear slots 100 that is approximately one degree.

As explained in more detail below, it is sometimes beneficial to define the angle 118 between each radial slot 100 by determining a design maximum width W of the outermost segment 114 in a radial sector 116 and a design minimum width of the innermost segment 114 in a radial sector 116. Setting a maximum width of the outermost segment 114 and a minimum width of the innermost segment 114 in a radial sector 116 makes the angle 118 between the slots 100 determinable based on the geometries of the part. For example, and as best seen in FIG. 6, if the component 130 of FIG. 4 has an outside diameter of approximately 49 millimeters (about 1.93 inches) and an inside diameter of approximately 36 millimeters (about 1.4 inches), it may be beneficial to have a maximum width of the outermost segment 114 that is less than 1000 microns (about 39.4 mils), such as less than 600 microns, or such as approximately 584 microns (about 23 mils), and a minimum width of the innermost segment 114 that is greater than 50 microns, such as greater than 200 microns, or such as greater than 400 microns, or approximately 432 microns (about 17 mils).

Additionally, it may be beneficial to have the height (H) of each segment 114 range from about 200 microns to about 1,000 microns, such as from about 400 microns to about 700 microns, such as from about 500 microns to about 600 microns, or approximately 533 microns (about 21 mils). If the minimum width of the innermost segment 114 is 432 microns (about 17 mils), the maximum width of the outermost segment 114 is 584 microns (about 23 mils), and the height H of each segment was 533 microns (about 21 mils), it would cause the angle 118 between each linear slot 100 to be approximately 1.36 degrees, for the specific geometry of the component 130 in this example.

In some examples, it is beneficial to limit the width and/or height of each segment 114 based on the depth of the slot. For example, the width and/or height of each segment 114 can be limited to not be greater than about 2.5 times the depth of the slots 100, such as 2.3 times to 2.5 times the depth of the slots. As an example, if the depth of the slots is about 15 mils (381 microns), the width and height of each segment 114 is limited to not be greater than about 37.5 mils (952.5 microns), such as 34.5 mils (876.3 microns) to 37.5 mils (952.5 microns). As another example, if the depth of the slots is about 10 mils (254 microns), the width and height of each segment 114 is limited to not be greater than about 25 mils (635 microns), such as 23 mils (584.2 microns) to 25 mils (635 microns).

Figure 7:
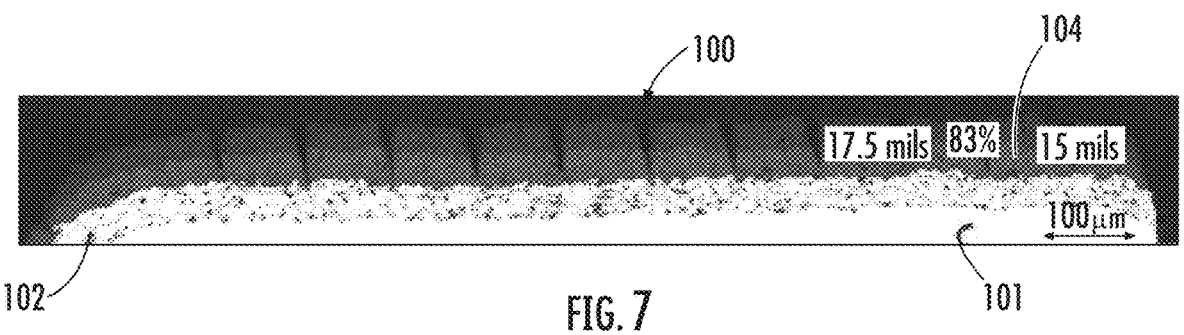
FIG. 7 illustrates a cross-sectional view of a portion of the component of FIG. 4 in accordance with one embodiment of the present disclosure.

Referring now also to FIG. 7, the thickness of the TBC 104 can range from about 100 microns (about 3.9 mils) to about 2500 microns (about 98.4 mils), such as about 350 microns (about 13.8 mils) to about 700 microns (about 27.5 mils), or from about 254 microns (about 10 mils) to about 508 microns (about 20 mils). For example, the thickness of the TBC 104 can be about 381 microns (about 15 mils). In this example, the slots 100 may extend only partially through the thickness of the TBC 104 such that a portion of the thickness of the TBC 104 does not include slots 100. For example, the depth that slots 100 extend may range from about 25 percent to about 100 percent, such as about 50 percent to about 90 percent, or about 80 to about 90 percent.

In the example of FIG. 7, slots 100 extend through approximately 83 percent of the TBC 104 such that 17 percent of the thickness of the TBC 104 does not include the slots 100. More specifically, when the thickness of the TBC 104 is approximately 381 microns (about 15 mils), the slots 100 can have a depth of approximately 317.5 microns (about 12.5 mils). In this example, slots 100 do not extend into the bond coat 102 or the substrate 101.

In some examples, the substrate 101 defines a flat surface such that it does not include any slots 100, grooves, notches, indentations, or serrations. For example, the substrate 101 can define a surface that is flat such that every point on the surface of the substrate 101 is located on approximately the same plane. In other examples, the substrate 101 may not be flat and may include features that deviate from a plane that lies on a majority of the surface of the substrate 101. For example, the substrate 101 may include a fillet at one or more of the edges of the substrate 101, a portion that includes an irregularly shaped surface, or features such as cooling holes, bolt hole, grooves, notches, indentations, or serrations, to name a few.

In the example of FIG. 4-FIG. 7, the slots 100 are all disposed on the same plane. For example, the partial, cross-sectional view of FIG. 7 shows that each slot 100 is disposed on a portion of the surface of the substrate 101 that is planar, i.e., all points on the portion of the surface are all on approximately the same plane. Also in this example, the slots 100 are disposed so that they are perpendicular to the surface of the substrate 101. However, it should be understood that the slots 100 can deviate from being perpendicular and the angle 118 between the substrate 101 and the slots 100 can range from about 30 degrees to 150 degrees.

Figure 8:
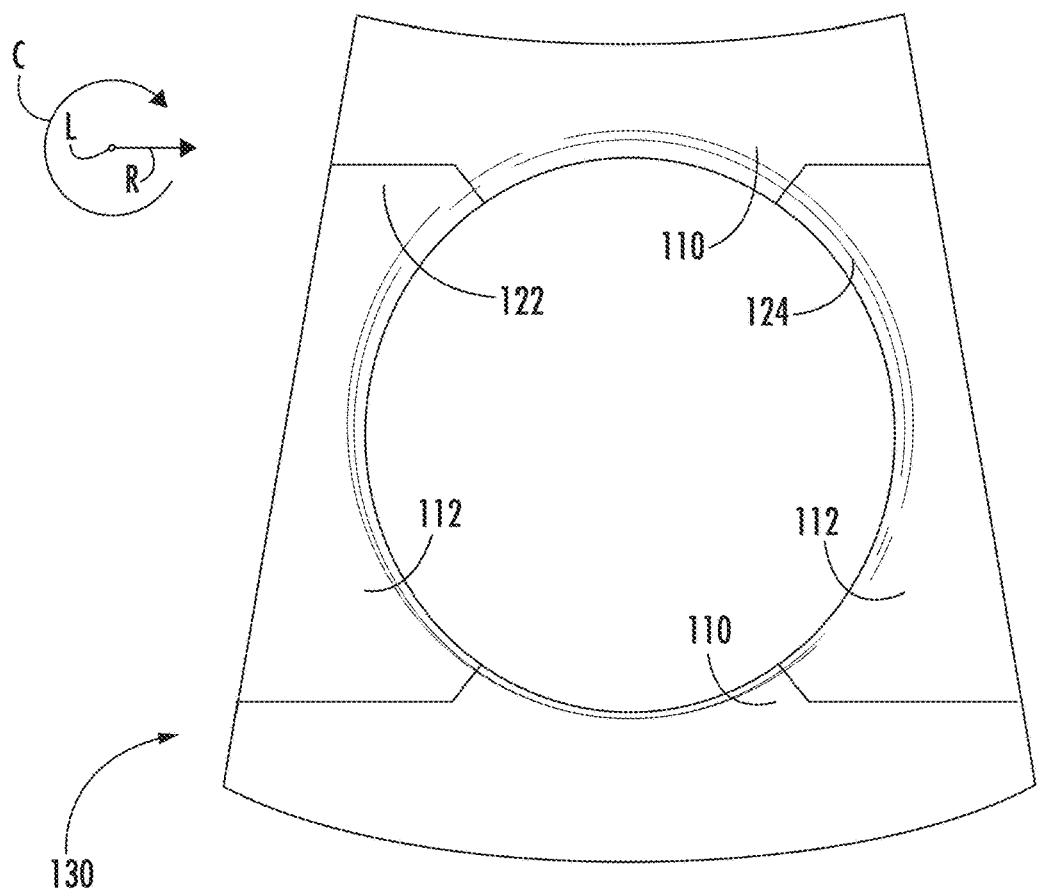
FIG. 8 illustrates a component for a gas turbine engine with a plurality of slots in accordance with one embodiment of the present disclosure.

Now referring to FIG. 8, a component 130 for a gas turbine engine, according to one example, is shown. In this example, the component 130 is a heat deflector for a dome assembly for the combustor section of a gas turbine engine. The component 130 can define a longitudinal direction L, going into and out of the drawing sheet and along the center of the component 130, radial directions R that are each perpendicular to the longitudinal direction and extend along a radius from the longitudinal direction, and circumferential directions C that each follow a circumference around the longitudinal direction.

The component 130 of FIG. 8, similarly to the component 130 of FIG. 4, features linear slots 100 that are disposed in the TBC 104 that extend radially and non-linear slots 100 that are disposed in the TBC 104 that extend circumferentially. The slots 100 can be disposed in a quasi-grid pattern, forming segments 114 of TBC 104 material on the surface of the substrate 101, as best seen in the enlarged partial view of FIG. 9. As used herein, "slot" can also refer to grooves, notches, indentations, or serrations in the TBC 104. Even though non-linear slots 100 are shown extending in a circumferential direction, it should be understood that other non-linear directions of the slots 100 are contemplated. For example, non-linear slots 100 could extend in an elliptical direction. In another example, non-linear slots 100 can include linear portions and can extend such that each non-linear slot 100 forms a curved square or curved rectangle. In some examples, the non-linear slot 100 follows a path that is substantially parallel to certain features of the component 130. For example, and as seen in the examples of FIG. 4 and FIG. 8, the non-linear slots 100 follow a path that is substantially parallel to an outer circumference of an aperture in the component 130. In other examples, the non-linear slots 100 can follow a path that is parallel to an outer diameter of a component 130.

The slots 100 may not extend to the full dimensions of the component 130. For example, as seen in FIG. 8, the non-linear slots 100 only extend partially around an aperture of the component 130. In this example, they only extend approximately 80 to 100 degrees around an aperture of the component 130; for example, approximately 90 degrees around an aperture of the component 130.

In some examples, the slots 100 are strategically placed in regions where a need for the slots 100 exist, such as potential high distress zones 112 of the component 130. High distress zones 112 can include regions of the component 130 that experience strain mismatch between the TBC 104 and the substrate 101 on cycling to very high temperatures. In the high distress zones 112, the slots 100 provide compliance, which can prevent cracking, buckling, or spallation during thermal cycling. Referring again to FIG. 8, the slots 100 are located in regions of potential high distress zones 112 and not located in regions of low distress zones 110.

Figure 9:
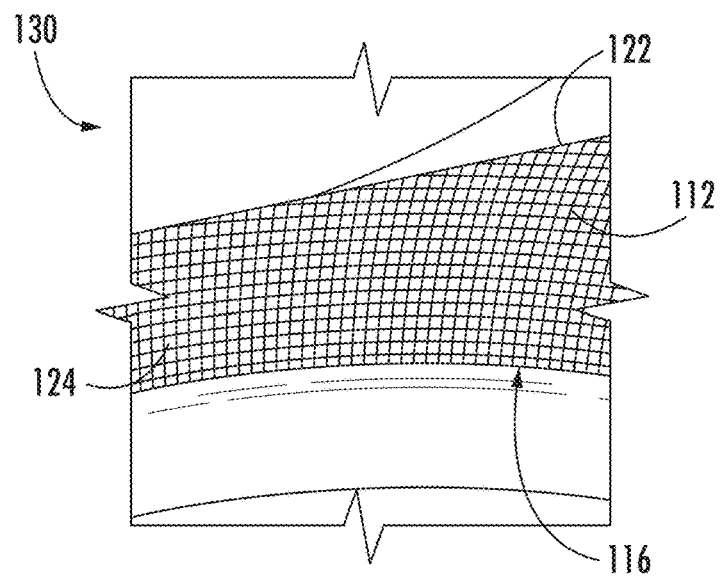
FIG. 9 illustrates a side view of the component of FIG. 8 in accordance with one embodiment of the present disclosure.

Now referring also to FIG. 9, the surface of the component 130 can include a planar region 122 and an out-of-plane region 124. As used herein, "planar region" refers to the region that lies on the major plane of the object. The object can refer to the surface of the substrate 101 of the component 130, the surface of the bond coat 102, or the surface of the TBC 104. The "major plane" is the plane where a majority of the points on the object are located. As used herein, "out-of-plane region" refers to a region of an object that has a tangent that is at an angle relative to the planar region 122. Said in another way, the "out-of-plane region" refers to the regions that have all points that are not on the major plane.

A component 130 can include more than one out-of-plane region 124. For example, one out-of-plane region 124 can be defined by a fillet radius for an aperture of the component 130. Another out-of-plane region 124 can be defined by a fillet radius for an outside edge of the component 130.

The slots 100 can extend so that they are disposed on both the planar region 122 and the out-of-plane region 124. For example, as seen in at least FIG. 8, each linear slot 100 can begin at approximately an outer periphery of the planar region 122 of the component 130 and end at approximately an inner periphery of the out-of-plane region 124 of the component 130. In some examples, a linear slot 100 can begin at a middle portion of the planar region 122 and end at approximately an inner periphery of the out-of-plane region 124.

Figure 10:
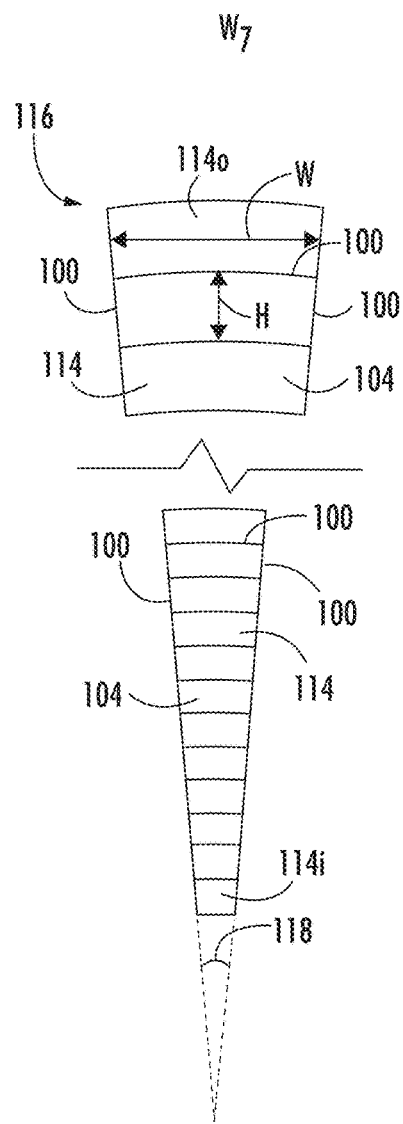
FIG. 10 illustrates a radial sector of the component of FIG. 8 in accordance with one embodiment of the present disclosure.
Figure 11:
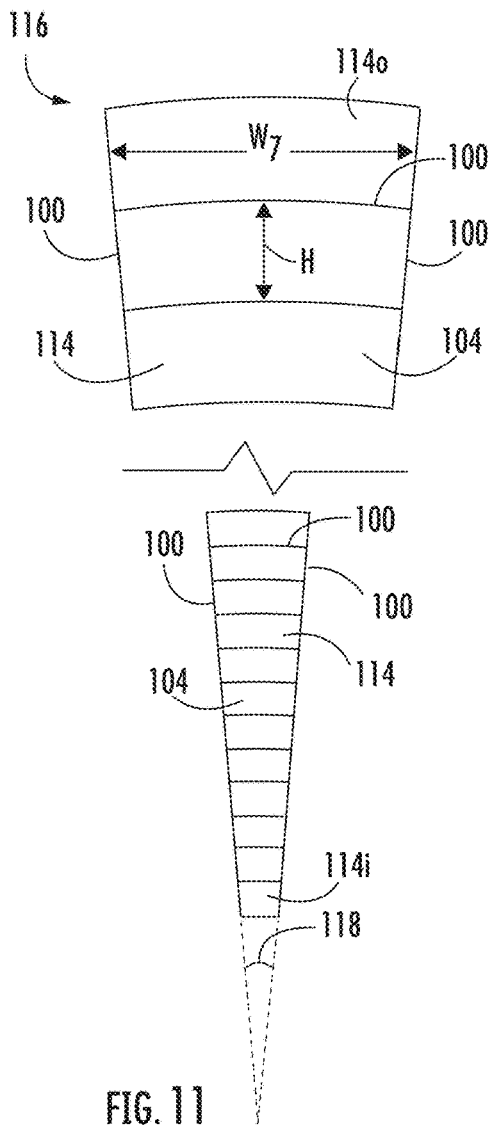
FIG. 11 illustrates a radial sector of the component of FIG. 8 in accordance with one embodiment of the present disclosure.

Now referring also to FIG. 10 and FIG. 11, a schematic view of two different radial sectors 116 of the component 130 of FIG. 8 are shown. It should be understood that because these are schematic views, the elements shown in the figure are not drawn to scale. The radial sector 116 of FIG. 10 can be the radial sector 116 of the component 130 of FIG. 8 with the least number of segments 114 whereas the radial sector 116 of FIG. 11 can be the radial sector 116 of the component 130 of FIG. 8 with the greatest number of segments 114.

In one example, in both radial sector 116 of FIG. 10 and radial sector 116 of FIG. 11, the innermost segment 114 (depicted in the examples as 114$i$) can have a width W that ranges between about 300 microns (about 11.8 mils) to about 1,000 microns (about 39.4 mils), such as about 500 microns (about 19.7 mils) to about 540 microns (about 21.3 mils), or such as about 520.7 microns (about 20.5 mils) to 525.8 microns (about 20.7 mils).

The width of the outermost segment 114 (depicted in the examples as 114$o$) of the radial sector 116 of FIG. 10 and the width of the outermost segment 114 of the radial sector 116 of FIG. 11 can differ. For example, the width of the outermost segment 114 of the radial sector 116 of FIG. 10 can range from about 200 microns (about 7.9 mils) to about 700 microns (about 27.6 mils), such as about 450 microns (about 17.7 mils) to about 550 microns (about 21.7 mils); for example, 520.7 microns (about 20.5 mils), whereas the width of the outermost segment 114 of the radial sector 116 of FIG. 11 can range from about 300 microns (about 11.8 mils) to about 1,000 microns (about 39.4 mils), such as about 700 microns (about 27.5 mils) to about 760 microns (about 29.9 mils), for example 729 microns (about 28.7 mils).

In some examples, it is beneficial to limit the width W and/or height H of each segment 114 based on the depth of the slot. For example, the width and/or height of each segment 114 can be limited to not be greater than about 2.5 times the depth of the slots 100, such as 2.3 times to 2.5 times the depth of the slots. As an example, if the depth of the slots is about 15 mils (381 microns), the width and height of each segment 114 is limited to not be greater than about 37.5 mils (952.5 microns), such as 34.5 mils (876.3 microns) to 37.5 mils (952.5 microns). As another example, if the depth of the slots is about 10 mils (254 microns), the width and height of each segment 114 is limited to not be greater than about 25 mils (635 microns), such as 23 mils (584.2 microns) to 25 mils (635 microns).

Figure 12:
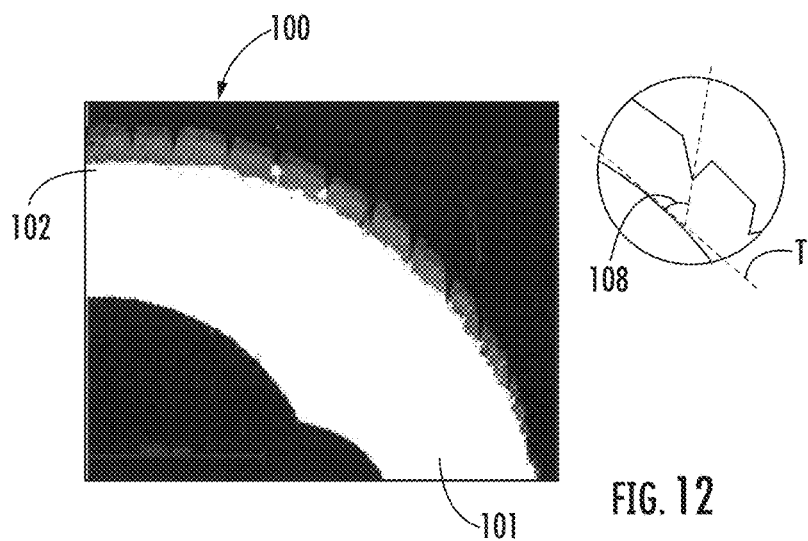
FIG. 12 illustrates a cross-sectional view of a portion of the component of FIG. 8 in accordance with one embodiment of the present disclosure.

Referring now also to FIG. 12, the thickness of the TBC 104 can range from about 100 microns (about 3.9 mils) to about 2,500 microns (about 98.4 mils), such as about 250 microns (about 9.8 mils) to about 500 microns (about 19.7 mils). For example, the thickness of the TBC 104 can be about 381 microns (about 15 mils). In this example, the slots 100 may extend only partially through the thickness of the TBC 104 such that a portion of the thickness of the TBC 104 does not include slots 100. For example, slots 100 can extend through only about 40 percent to about 90 percent, such as only 75 percent to about 85 percent. For example, slot 100 may extend through approximately 83 percent of the TBC 104 such that 17 percent of the thickness of the TBC 104 does not include the slots 100. More specifically, when the thickness of the TBC 104 is approximately 381 microns (about 15 mils), the slots 100 can have a depth of approximately 317.5 microns (about 12.5 mils).

As best seen in FIG. 12, the substrate 101 can define a relatively smooth surface such that it does not include any slots 100, grooves, notches, indentations, or serrations. For example, the substrate 101 can define a surface that is smooth such that points that are nearby to one another are located on approximately the same plane. In this example, the substrate 101 includes a planar region 122 and an out-of-plane region 124 that is a fillet at the interior edge of the component 130, which defines the orifice of the component 130, but still has a smooth surface. Even though a fillet curve exists, the surface is still to be considered smooth.

In other examples, the substrate 101 may not be smooth and may include features that deviate from a plane that lies on a majority of the surface of the substrate 101. For example, a portion that includes an irregularly shaped surface, or features such as cooling holes, bolt holes, grooves, notches, indentations, or serrations, to name a few.

As best seen in the cross-sectional view of FIG. 12, the slots 100 may be perpendicular to the surface on the planar region 122 of the component 130 but may deviate from being perpendicular to the surface on the out-of-plane regions. For example, the angle 108 between the slot 100 and the tangent (T) of the surface where the slot is present can range from about 10 degrees to about 85 degrees, such as about 30 degrees to about 85 degrees, or such as about 60 degrees to about 85 degrees.

In some examples, all of the non-linear slots 100 in a radial sector 116 are parallel to each other such that the non-linear slots 100 deviate from being perpendicular to the surface of the substrate 101 in the out-of-plane regions. In one example, the slots 100 on the planar region 122 and the non-planar region 122 are perpendicular to the planar region 122. In yet another example, the angle 108 between all slots 100 and the surface of the planar region 122 can range from about 60 degrees to 120 degrees. The variation of the angle 108 between adjacent slots 100 can deviate by up to 10 degrees; for example, the angle 108 between adjacent slots 100 can deviate by up to 3 degrees.

Figure 13:
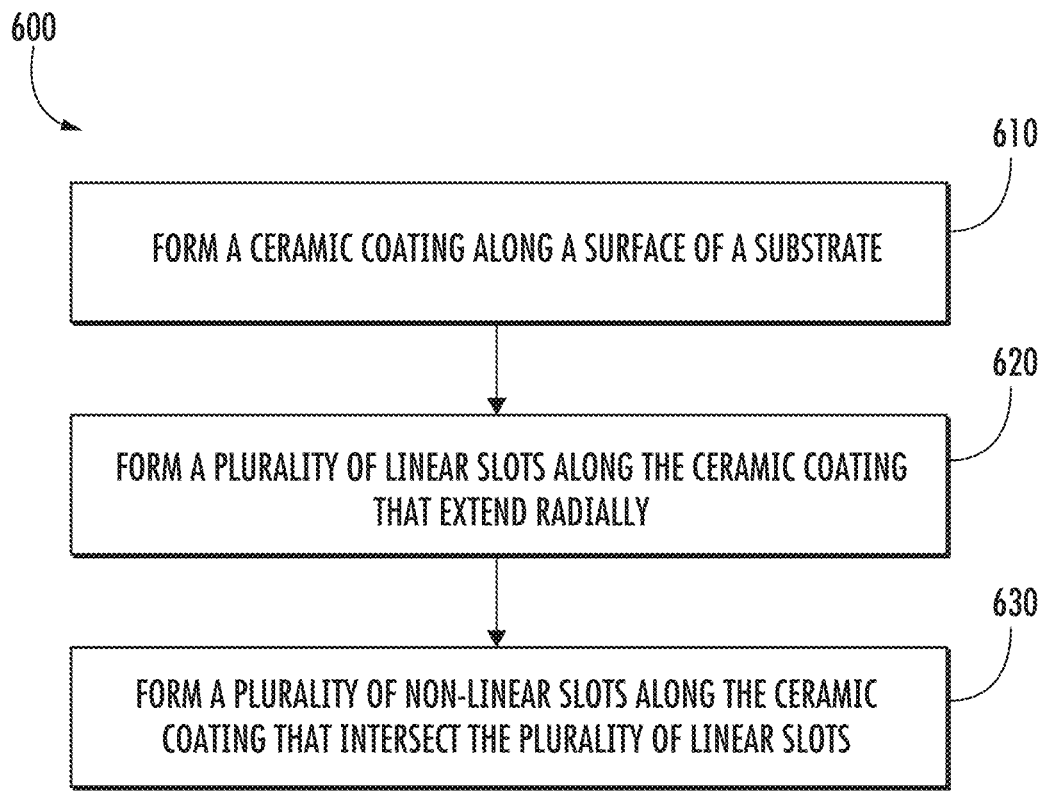
FIG. 13 is a flowchart of a method of forming a coating in accordance with one embodiment of the present disclosure.

FIG. 13 is a flowchart of a method 600 of forming a coated component 130 for a gas turbine engine, the coated component 130 defining a longitudinal direction, according to one example. The method 600 includes the step 610 of forming a ceramic coating 120 along a surface of a substrate 101, the step 620 of forming a plurality of linear slots 100 along the ceramic coating 120 that extend radially from the longitudinal direction, and the step 630 of forming a plurality of non-linear slots 100 along the ceramic coating 120 that intersect the plurality of linear slots 100. The plurality of linear slots 100 and the plurality of non-linear slots 100 can form segments 114 of ceramic coating 120 material.

In some embodiments, the surface of the substrate 101 has a planar region 122 and an out-of-plane region 124 such that all points on the out-of-plane region 124 are on a different plane than the planar region, and forming a plurality of linear slots 100 comprises forming at least one of the plurality of linear slots 100 on both the planar region 122 and the out-of-plane region 124.

In some embodiments, the step of forming a plurality of linear slots 100 comprises forming at least one linear slot 100 only in the ceramic coating 120 such that it does not extend into the surface of the substrate 101 or a bond coat 102, and the step of forming a plurality of non-linear slots 100 comprises forming at least one non-linear slot 100 only in the ceramic coating 120 such that it does not extend into the surface of the substrate 101 or the bond coat 102.

In some embodiments, the step of forming a plurality of linear slots 100 comprises forming each of the plurality of linear slots 100 such that each is spaced apart from another slot 100 by about 100 microns to about 1,000 microns (about 39.4 mils), such as about 150 microns (about 5.9 mils) to about 700 microns (about 27.6 mils), or about 430 microns (about 17 mils) to about 490 microns (about 19.3 mils) at an innermost segment 114 of the coated component 130, and the distance between each of the plurality of linear slots 100 continuously increases as it gets further away from the innermost segment 114.

In some embodiments, the step of forming a plurality of non-linear slots 100 comprises forming a non-linear slot 100 in a circumferential direction around an orifice of the coated component 130.

The resulting coating has an improved life in aggressive environments, such as those with high concentrations of airborne particulates, including dust, sand, etc. Components can experience the build-up of molten dust deposits that contain calcium oxide, magnesium oxide, alumina, and silica, generally known as CMAS. The environmental dust may be characterized by various parameters, such as the "PM10 level" (particulate matter less than 10 microns). In such environments, the prior TBCs can become compromised and spall as a result of CMAS degradation. The present coating has an improved combination of CMAS resistance, strain tolerance, and thermal resistance. The slots can improve the resistance to CMAS attack and increase component life. The geometry of the slots, the width, and the spacing of the slots may be modified to achieve the desired coating.

The slots may provide mechanical compliance and strain tolerance to prevent TBC spallation, such as in components that experience cycling in high temperature environments. Due to strain mismatch between TBC materials and a metal substrate on cycling at very high temperatures, coatings need compliance in order to prevent cracking, buckling, and spallation during thermal cycling. The compliance has previously been provided by microstructure engineering (using pores, cracks, columnar microstructures, etc.). However, such compliance can be reduced when turbines are operated in environments where there are high dust levels, because the dust fuses and infiltrates into the TBC, reducing the compliance that has been introduced by the microstructure engineering. The slots in the present coating prevent or reduce the decrease in TBC performance due to CMAS infiltration. The slots have an additional advantage in terms of their ability to tolerate molten CMAS, as has been demonstrated and observed in test coupons after testing in cycling CMAS exposure conditions.

While the present disclosure discusses heat shields for a fuel nozzle and a heat deflector for a dome assembly, the principle of the coating to improve mechanical compliance and strain tolerance can be applied anywhere involving high temperature components exposed to dust and particulates (e.g., high pressure turbines (HPT), low pressure turbines (LPT), high pressure compressor (HPC), or low pressure compressor (LPC)). The coating system is particularly suitable for use in gas turbine engines, for example, combustor components (e.g., combustor liners), blades (including turbine and combustion airfoils), shrouds, nozzles, heat shields, and vanes.

EXAMPLES

Differentiating Porous APS TBC & DVM-TBC:

A coating was formed to include a plurality of slots formed therein. The coating was tested with a range of TBC coatings on nickel-based super-alloy coupons. The slots were machined in the TBC to produce TBC segments, or a segmented TBC structure. A single layer TBC was tested, with the single layer TBC formed of an air plasma sprayed porous "8YSZ" TBC, which refers to the yttria stabilized zirconia composition of zirconia with 8 wt % yttrium oxide. The TBC thickness on the single layer APS coating that was tested was nominally 380 microns (about 15 mils) thick.

The two-layer TBC is described as a dense vertically microcracked TBC (DVM-TBC). In the DVM-TBC, the first or base layer was 8YSZ and the second layer had a higher concentration of yttria stabilized zirconia (YSZ). In the present example, a TBC was formed with a second layer of about 55YSZ (55 wt % $Y_2O_3$ in 45% $ZrO_2$). The total TBC thickness on the two-layer DVM was nominally 635 microns (about 25 mils) thick. The base 8YSZ layer was about 381 microns (i.e., about 15 mils) thick and the top layer was about 254 microns (i.e., about 10 mils) thick.

TBC Slotting Methods:

A range of slotting approaches were considered based on the slot geometry that was required, the reproducibility of the manufacturing method, the speed of producing the slots, the cost of producing the slots, and the component application performance requirements. It is preferable to use a cost-effective scalable method to slot TBCs, because of the number of segments that are potentially required in large parts. In the present example, several methods were utilized to slot TBCs, where some methods are more easily scalable than others. For example, methods may include (a) diamond saw cutting, (b) ultrashort pulse laser such as picosecond or femtosecond laser slotting, and (c) nanosecond laser slotting. Other methods can also be used. The maximum slot depth that is preferred is up to approximately 80% of the total TBC thickness. For example, on the APS porous 8YSZ TBC, the maximum slot depth is about 300 microns (i.e., about 12 mils) and for the two-layer DVM 55YSZ, the maximum slot depth is about 500 microns (i.e., about 20 mils). Laser slotting is the preferred cost-effective scalable method to slot turbine components. Laser slotting is compatible with most aerospace manufacturing processes and quality requirements.

Testing Slotted and Unslotted Coupons to Demonstrate Benefit:

The coupons were tested using two different methods to simulate the engine operating environment. The first test is the Jet Engine Thermal Shock (JETS) test, and the second test is Furnace cycle testing (FCT); both of these tests are described in more detail below:

Jet engine thermal shock (JETS) test: The slotted coupons were tested to evaluate their ability to withstand multiple thermal shocks at temperatures in the presence of atmospheric dust as represented by a standard CMAS dust, as described in more detail below. The JETS test employs a high temperature gradient across the thickness of the test coupon. The temperature gradients employed are like those that components experience in an engine. The thermal shock testing in the presence of dust simulates the thermal cycling and environmental dust exposure that components experience in the turbine section of aircraft turbomachinery in general operation. For the purposes of this description, the term "nominal CMAS" refers to the following composition, with all percentages in mole percent: 41.6% silica ($SiO_2$), 29.3% calcia (CaO), 12.5% alumina ($AlO_{1.5}$), 9.1% magnesia (MgO), 6.0% iron oxide ($FeO_{1.5}$), and 1.5% nickel oxide (NiO). It will be appreciated that the nominal CMAS composition given in this definition represents a reference composition to define a benchmark for the substance's CMAS reactivity in a way that can be compared to the CMAS reactivity of other substances; use of this reference composition does not limit in any way the actual composition of ingested material that becomes deposited on the coating during operation which, of course, will vary widely in service.

Furnace cycle testing (FCT): The slotted coupons were subjected to cyclic thermal exposure in a high-temperature furnace. During a one-hour cycle, the coupons were inserted rapidly into a bottom-loading furnace and held at 1135° C. for 45 min. At temperature, the coupon is essentially isothermal. The slotted coupons were then withdrawn from the furnace and forced-air cooled for 15 min before beginning the next cycle. Specimens were removed from the FCT and examined for spallation after 20 cycles. The samples remained in the test until spallation of 20% of the total TBC coating area; this measurement was used as a gauge of the FCT life.

Example 1: Slotted vs Unslotted APS-TBC & DVM-TBC (B151106)

Figure 14A:
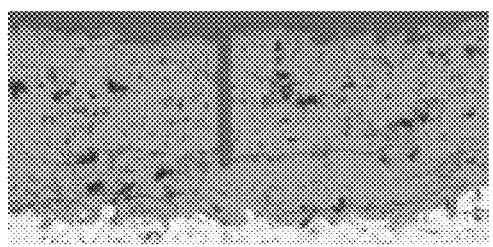
FIG. 14A is a micrograph of a cross section of a coating in accordance with one embodiment of the present disclosure.
Figure 14B:
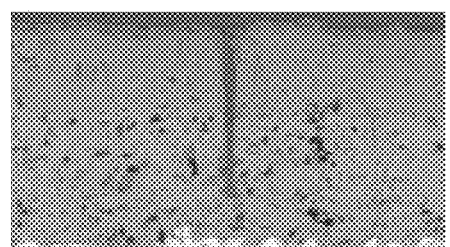
FIG. 14B is a micrograph of a cross section of a two-layer coating in accordance with one embodiment of the present disclosure.

The examples described below clearly demonstrate the benefit of slotting and the resulting segmented microstructure, irrespective of TBC thickness and the chemistry. The first slots were formed using high speed diamond saw cutting. The slot spacing was kept constant at 100 microns apart (i.e., about 40 mils) for both types of TBCs (the single layer system and the two-layer system). The slot depth was adjusted as a function of the total TBC thickness. The slots in the APS-TBC were 300 microns (about 12 mils) deep, and the slots in DVM-TBC were 500 microns deep. The nominal slot width was kept constant at 25 microns. Micrographs showing the slotted 8YSZ TBC and the DVM TBC are shown in FIGS. 14A and 14B, respectively. Both slotted samples and unslotted coupons were JETS tested. The results showed that the slotted samples with the preferred architectures survived significantly better than the control samples without any slotting. Typically, the JETS test life of the TBC was increased by at least 25%.

Example 2: Effect of Slot Spacing on Furnace Cycle Testing at 2075° F.

Figure 15:
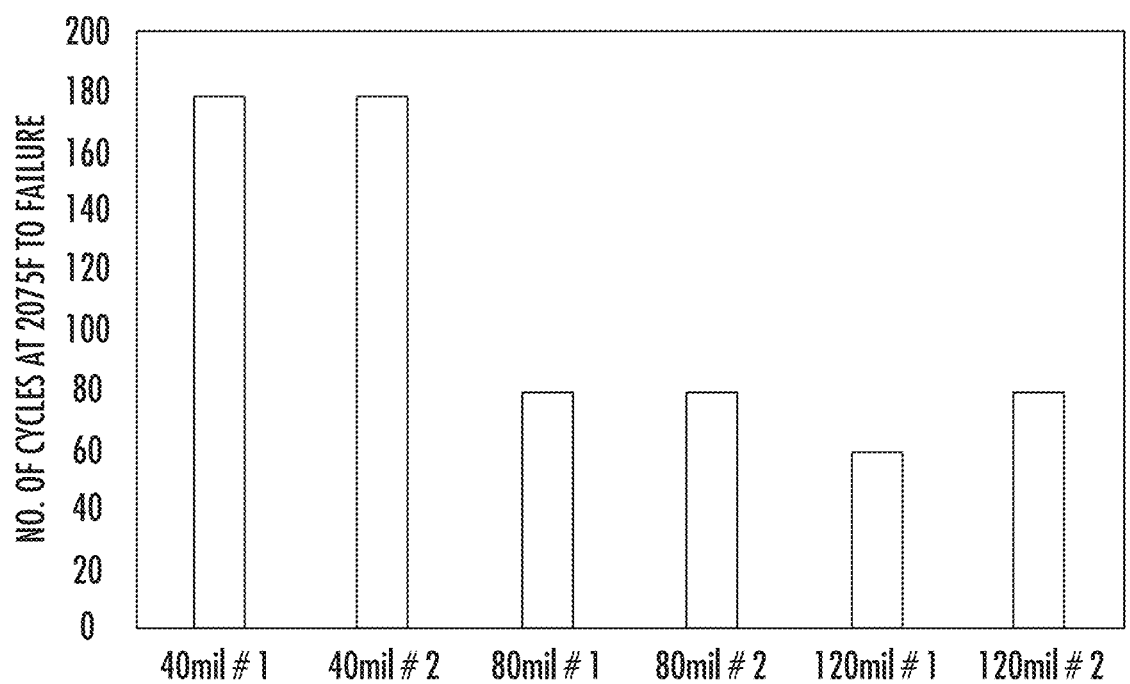
FIG. 15 is a bar graph showing data for two coupons of each of the geometries tested in the Examples.

In order to determine the preferred slot spacing for improved compliance and CMAS resistance, coupons with slot spacing from 40 mils (1016 microns wide) to 120 mils (3048 microns wide) were investigated. The coupons were air plasma sprayed 8YSZ TBC with a thickness of 380 microns. The slots were formed using high speed diamond saw cutting. The slot depth was 250 microns and the width was nominally 25 microns. The slots produced 1,000 microns square segments with a spacing of 25 microns. TBC segments of 2,000 microns size and 3,000 microns size were produced and also tested as described below. The slotted coupons were thermally cycled in an FCT furnace. FIG. 15 shows data for two coupons of each of the geometries tested. The FCT procedure is described above. Coupons with 1,000 microns slot spacing had more than 2× better life than either 2,000 microns slot spacing or 3,000 microns slot spacing coupons. The test results indicate an infant mortality risk for the TBC on a component if the FCT coupon's life is below 100 cycles, as is the case for the 2,000 microns slot spacing or 3,000 microns slot spacing coupons.

Figure 16:
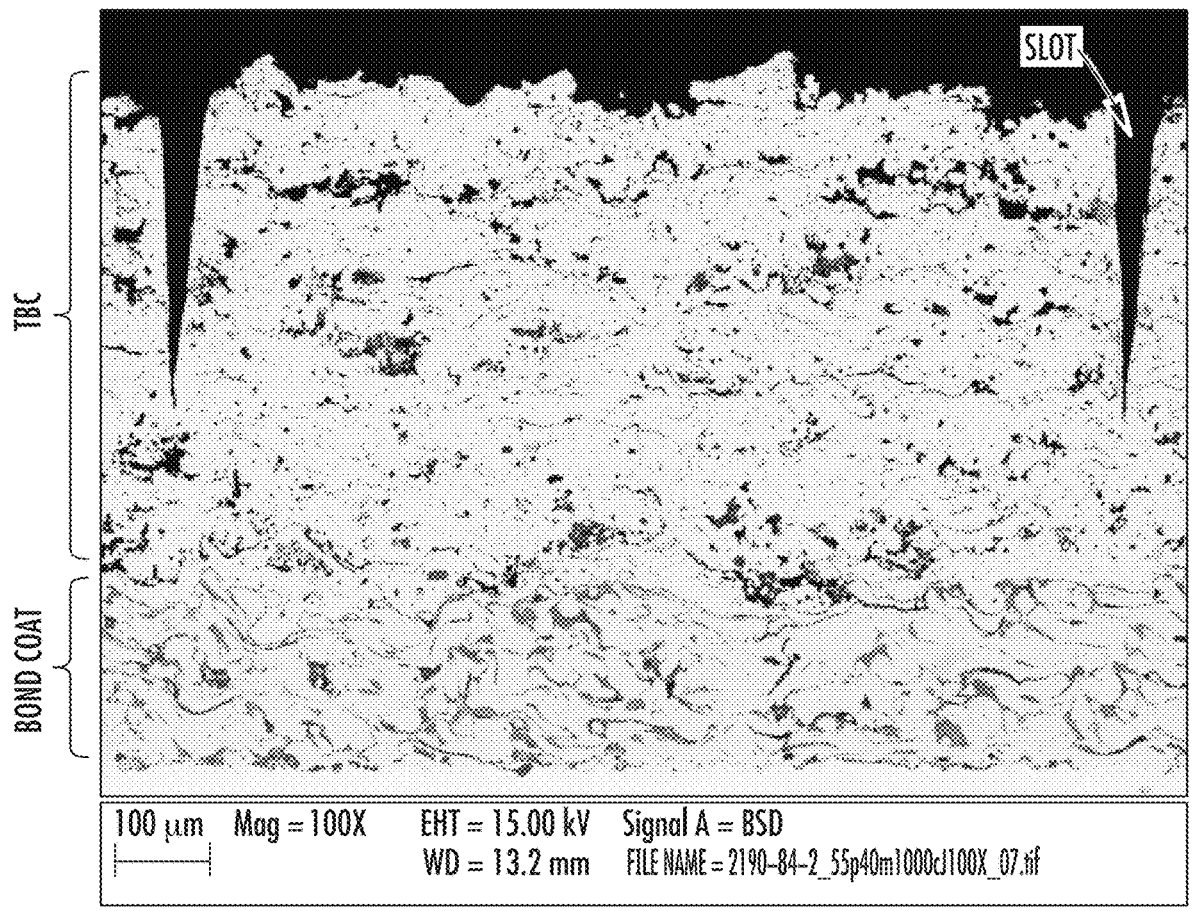
FIG. 16 is a micrograph of the slotted TBC of the Examples.

Example 3: Comparison Between the Slots Produced Using a Picosecond Laser, and the Slots Produced Using a Nanosecond Laser Slotting The results of the present example demonstrate that the improved CMAS resistance provided by the slots and the resulting TBC segments does not depend on the slotting method. Two different laser systems were used to slot the TBCs. One set of coupons were slotted using a picosecond laser, and a second set of coupons were slotted using a nanosecond laser system. The coupons that were produced included the DVM 55YSZ with slot spacing of 1,000 microns and 500 microns deep. The slot width was about 75 microns on the top surface of the TBC and about 10 microns at the bottom of the slot. A micrograph of the slotted TBC is shown in FIG. 16. Both sets of slotted TBCs were tested together with unslotted TBC baseline coupons using the method described above. Both sets of slotted coupons showed significantly better performance than the baseline coupon without slots. The improved CMAS resistance provided by both the picosecond and the nanosecond slotted coupons were almost the same.

Figure 17:
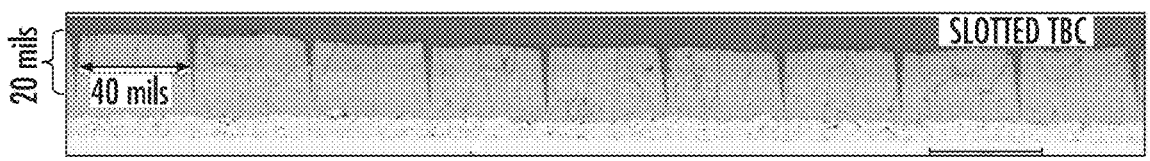
FIG. 17 shows an optical micrograph of a slotted, two-layer DVM 55YSZ with slot spacing of 1000 microns and 500 microns deep, according to the Examples.

FIG. 17 shows an optical micrograph of slotted two-layer DVM 55YSZ with slot spacing of 1000 microns and 500 microns deep. The slot width was about 75 microns on the top surface of the TBC and about 10 microns at the bottom of the slot.

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A coated component for a gas turbine engine, the coated component defining a longitudinal direction, the coated component comprising: a substrate defining a surface; and a ceramic coating disposed along the surface of the substrate, the ceramic coating comprising: a plurality of linear slots disposed in the ceramic coating; and a plurality of non-linear slots disposed in the ceramic coating that intersect the plurality of linear slots, the plurality of linear slots and the plurality of non-linear slots forming segments of ceramic coating material.
2. The coated component of any preceding clause wherein each of the plurality of linear slots extend radially from the longitudinal direction.
3. The coated component of any preceding clause wherein the surface of the substrate has a planar region and an out-of-plane region such that all points on the out-of-plane region are on a different plane than the planar region, wherein at least one of the plurality of linear slots is disposed on both the planar region and the out-of-plane region.
5. The coated component of any preceding clause wherein each of the plurality of linear slots extends into the ceramic coating a depth, and a maximum distance between each of the plurality of linear slots is no greater than about 2.5 times the depth of the plurality of linear slots.
6. The coated component of any preceding clause wherein the plurality of linear slots and the plurality of non-linear slots are only disposed in the ceramic coating and do not extend into the surface of the substrate.
7. The coated component of any preceding clause wherein a distance between each of the plurality of linear slots is from about 430 microns to about 490 microns at an innermost segment of the coated component, and the distance between each of the plurality of linear slots continuously increases as it gets further away from the innermost segment.
8. The coated component of any preceding clause wherein the angle between at least one of the linear slots and a tangent at the surface where the linear slot is disposed is about 10 degrees to about 85 degrees.
9. The coated component of any preceding clause wherein each of the plurality of non-linear slots extends circumferentially around an orifice in the coated component.
10. The coated component of any preceding clause wherein the coated component is a fuel nozzle heat shield for a combustion chamber.
11. The coated component of any preceding clause wherein the coated component is a component for a dome assembly for a combustion chamber.
12. The coated component of any preceding clause wherein each of the plurality of linear slots and each of the plurality of non-linear slots extend 50 microns to 1,000 microns deep into the ceramic coating.
13. The coated component of any preceding clause wherein the ceramic coating comprises yttria stabilized zirconia, a rare earth stabilized zirconia composition, mullite, alumina, ceria, rare-earth zirconates, rare-earth oxides, metal-glass composites, or combinations thereof.

14. A method of forming a coated component for a gas turbine engine, the coated component defining a longitudinal direction, the method comprising: forming a ceramic coating along a surface of a substrate; forming a plurality of linear slots along the ceramic coating; and forming a plurality of non-linear slots along the ceramic coating that intersect the plurality of linear slots such that the plurality of linear slots and the plurality of non-linear slots form segments of ceramic coating material.

15. The method of any preceding clause wherein each of the plurality of linear slots extend radially from the longitudinal direction.

16. The method of any preceding clause wherein the surface of the substrate has a planar region and an out-of-plane region such that all points on the out-of-plane region are on a different plane than the planar region, wherein the step of forming a plurality of linear slots comprises forming at least one of the plurality of linear slots on both the planar region and the out-of-plane region.

17. The method of any preceding clause wherein the step of forming a plurality of linear slots comprises forming at least one linear slot only in the ceramic coating such that it does not extend into the surface of the substrate or a bond coat, and the step of forming a plurality of non-linear slots comprises forming at least one non-linear slot only in the ceramic coating such that it does not extend into the surface of the substrate or the bond coat.

18. The method of any preceding clause wherein a distance between each of the plurality of linear slots is from about 430 microns to about 490 microns at an innermost segment of the coated component, and the distance between each of the plurality of linear slots continuously increases as it gets further away from the innermost segment.

19. The method of any preceding clause wherein the step of forming a plurality of non-linear slots comprises forming a non-linear slot in a circumferential direction around an orifice of the coated component.

20. The method of any preceding clause wherein each of the plurality of linear slots extends into the ceramic coating a depth, and a maximum distance between each of the plurality of linear slots is no greater than about 2.5 times the depth of the plurality of linear slots.

What is claimed is:

1. A coated component for a gas turbine engine, the coated component defining a longitudinal direction, the coated component comprising:
a substrate defining a surface; and
a ceramic coating disposed along the surface of the substrate, the ceramic coating comprising:
a plurality of linear slots disposed in the ceramic coating, the plurality of linear slots extending through 80 percent or more of a thickness of the ceramic coating; and
a plurality of non-linear slots disposed in the ceramic coating that intersect the plurality of linear slots, the plurality of non-linear slots extending through the ceramic coating to an end point above the surface of the substrate; the plurality of linear slots and the plurality of non-linear slots defining radial sectors between adjacent linear slots, each radial sector including a plurality of segments of ceramic coating material, each segment separated from an adjacent segment by one of the plurality of non-linear slots.

2. The coated component of claim 1, wherein each of the plurality of linear slots extends radially from the longitudinal direction from a center point of the coated component.

3. The coated component of claim 1, wherein the surface of the substrate has a planar region and an out-of-plane region such that all points on the out-of-plane region are on a different plane than the planar region, wherein at least one of the plurality of linear slots is disposed on both the planar region and the out-of-plane region.

4. The coated component of claim 1, wherein each of the plurality of linear slots extends into the ceramic coating a depth, and a maximum distance between each of the plurality of linear slots is no greater than about 2.5 times the depth of the plurality of linear slots.

5. The coated component of claim 1, wherein the plurality of linear slots and the plurality of non-linear slots are only disposed in the ceramic coating and do not extend into the surface of the substrate.

6. The coated component of claim 1, wherein a distance between each of the plurality of linear slots is from about 430 microns to about 490 microns at an innermost segment of the coated component, and the distance between each of the plurality of linear slots continuously increases as it gets further away from the innermost segment.

7. The coated component of claim 1, wherein an angle between at least one of the plurality of linear slots and a tangent at the surface where the at least one of the plurality of linear slots is disposed is about 10 degrees to about 85 degrees.

8. The coated component of claim 1, wherein each of the plurality of non-linear slots extends circumferentially around an orifice in the coated component.

9. The coated component of claim 8, wherein the coated component is a fuel nozzle heat shield for a combustion chamber.

10. The coated component of claim 3, wherein the coated component is a component for a dome assembly for a combustion chamber.

11. The coated component of claim 1, wherein each of the plurality of linear slots and each of the plurality of non-linear slots extend 50 microns to 1,000 microns deep into the ceramic coating.

12. The coated component of claim 1, wherein the ceramic coating comprises yttria stabilized zirconia, a rare earth stabilized zirconia composition, mullite, alumina, ceria, rare-earth zirconates, rare-earth oxides, metal-glass composites, or combinations thereof.

13. A method of forming a coated component for a gas turbine engine, the coated component defining a longitudinal direction, the method comprising:
forming a ceramic coating along a surface of a substrate;
forming a plurality of linear slots along the ceramic coating, wherein the plurality of linear slots extend through 80 percent or more of a thickness of the ceramic coating; and
forming a plurality of non-linear slots along the ceramic coating that intersect the plurality of linear slots, the plurality of non-linear slots extending through the ceramic coating to an end point above the surface of the substrate, wherein the plurality of linear slots and the plurality of non-linear slots define radial sectors between adjacent linear slots, each radial sector including a plurality of segments of ceramic coating material, each segment separated from an adjacent segment by one of the plurality of non-linear slots.

14. The method of claim 13, wherein each of the plurality of linear slots extends radially from the longitudinal direction from a center point of the coated component.

15. The method of claim 13, wherein the surface of the substrate has a planar region and an out-of-plane region such that all points on the out-of-plane region are on a different plane than the planar region, wherein the step of forming a plurality of linear slots comprises forming at least one of the plurality of linear slots on both the planar region and the out-of-plane region.

16. The method of claim 13, wherein the step of forming a plurality of linear slots comprises forming at least one linear slot only in the ceramic coating such that it does not extend into the surface of the substrate or a bond coat, and the step of forming the plurality of non-linear slots comprises forming at least one non-linear slot only in the ceramic coating such that it does not extend into the surface of the substrate or the bond coat.

17. The method of claim 13, wherein a distance between each of the plurality of linear slots is from about 430 microns to about 490 microns at an innermost segment of the coated component, and the distance between each of the plurality of linear slots continuously increases as it gets further away from the innermost segment.

18. The method of claim 13, wherein the step of forming a plurality of non-linear slots comprises forming a non-linear slot in a circumferential direction around an orifice of the coated component.

19. The method of claim 13, wherein each of the plurality of linear slots extends into the ceramic coating a depth, and a maximum distance between each of the plurality of linear slots is no greater than about 2.5 times the depth of the plurality of linear slots.

20. The coated component of claim 1, wherein each adjacent pair of linear slots is arranged such that an outermost segment of the radial sector formed by the adjacent pair of linear slots has a specified width based on an angle defined between the adjacent pair of linear slots.

\* \* \* \* \*